US009453479B1

(12) United States Patent
Jones (10) Patent No.: US 9,453,479 B1
(45) Date of Patent: Sep. 27, 2016

(54) SOLID FUEL GRAIN FOR A HYBRID PROPULSION SYSTEM OF A ROCKET AND METHOD FOR MANUFACTURING SAME

(76) Inventor: Ronald D. Jones, Tulsa, OK (US)

( * ) Notice: Subject to any disclaimer, the term of this patent is extended or adjusted under 35 U.S.C. 154(b) by 1973 days.

(21) Appl. No.: 12/052,934

(22) Filed: Mar. 21, 2008

Related U.S. Application Data (60) Provisional application No. 60/896,296, filed on Mar. 22, 2007.

(51) Int. Cl.
| | | |
|---|---|---|
| *F02K 9/72* | (2006.01) | |
| *F02K 9/08* | (2006.01) | |
| *B29C 67/00* | (2006.01) | |

(52) U.S. Cl.
CPC .............. *F02K 9/08* (2013.01); *B29C 67/0051* (2013.01)

(58) Field of Classification Search
CPC ......... C06B 21/005; F02K 9/72; F02K 9/08; F02K 9/18; B29C 67/0051
USPC .......... 60/251, 253, 255; 102/285, 286, 287, 102/289, 290, 291
See application file for complete search history.

(56) References Cited

U.S. PATENT DOCUMENTS

| | | | | |
|---|---|---|---|---|
| 3,002,459 A | * | 10/1961 | Harper ........................ | 102/287 |
| 3,022,735 A | * | 2/1962 | Eberle ........................ | 60/255 |
| 3,120,737 A | * | 2/1964 | Holloway ..................... | 60/253 |
| 3,226,928 A | * | 1/1966 | Jackson et al. ............... | 60/253 |
| 3,316,718 A | * | 5/1967 | Webb ........................... | 60/255 |
| 3,348,445 A | * | 10/1967 | Nadel ........................ | 102/289 |
| 3,646,597 A | * | 2/1972 | Feemster ..................... | 60/251 |
| 3,677,010 A | * | 7/1972 | Fink et al. ................... | 60/253 |
| 3,918,365 A | * | 11/1975 | Arribat ....................... | 60/250 |
| 5,062,365 A | * | 11/1991 | Canterberry .................. | 102/322 |
| 5,367,872 A | * | 11/1994 | Lund ........................... | F02K 9/72 |
| | | | | 102/288 |
| 5,386,777 A | * | 2/1995 | Lou et al. ..................... | 102/291 |
| 5,715,675 A | * | 2/1998 | Smith et al. ................... | 60/251 |
| 5,721,392 A | * | 2/1998 | Chan et al. ................. | 102/275.1 |
| 6,016,652 A | * | 1/2000 | Smith ......................... | F02K 9/72 |
| | | | | 60/251 |
| 6,022,207 A | * | 2/2000 | Dahlin ............... | B29C 67/0055 |
| | | | | 242/563.2 |
| 6,125,763 A | * | 10/2000 | Kline et al. ................... | 102/381 |
| 6,630,093 B1 | | 10/2003 | Jones | |
| 6,796,171 B2 | * | 9/2004 | Heisler et al. ................. | 73/147 |
| 7,777,155 B2 | * | 8/2010 | Twelves et al. ......... | 219/121.86 |
| 2005/0225007 A1 | * | 10/2005 | Lai et al. ..................... | 264/308 |

OTHER PUBLICATIONS

Pham, D.T. and Gault, R.S., A comparison of rapid prototyping technologies. International Journal of Machine Tools & Manufacture, vol. 38, Nos. 10-11 (Oct. 1998), pp. 1257-1287.*

* cited by examiner

*Primary Examiner* — Galen Hauth
(74) *Attorney, Agent, or Firm* — Polsinelli PC (57) ABSTRACT

A solid fuel grain suitable for use in hybrid propulsion systems has a generally cylindrical shape and defines a center port. The solid fuel grain is formed as a series of concentric layers arrayed around the center port. When incorporated into a rocket, an oxidizer is introduced into the solid fuel grain along a pathway defined by the center port, with combustion occurring along the exposed surface area of the solid fuel grain section adjacent to the center port. Each concentric layer has a surface pattern that serves to increase the surface area for combustion, a surface pattern that persists even as the fuel burns. To achieve such a construction, the concentric layers of the solid fuel grain are preferably manufactured using any one of several available freeform-fabrication machines capable of fabricating articles in a polymeric material suitable for a hybrid propulsion system.

16 Claims, 7 Drawing Sheets

SOLID FUEL GRAIN FOR A HYBRID PROPULSION SYSTEM OF A ROCKET AND METHOD FOR MANUFACTURING SAME

CROSS-REFERENCE TO RELATED APPLICATIONS

This application claims priority to U.S. Provisional Patent Application No. 60/896,296, filed on Mar. 22, 2007, the entire disclosure of which is incorporated herein by reference.

BACKGROUND OF THE INVENTION

The present invention relates to rocket propulsion systems.

There are two basic types of chemical rocket propulsion systems in wide use today, one type using liquid propellant and another type using solid propellant. A third rocket propulsion system, considered an alternative to liquid and solid propellant rocket propulsion systems, is called a hybrid propulsion system. In a hybrid propulsion system, one component is stored in the solid phase, while another component is stored in either the liquid or gaseous phase. In most hybrid propulsion systems, the solid component is the fuel, and the liquid or gas component is the oxidizer.

Rockets using hybrid propulsion systems offer certain advantages over rockets using solid or liquid systems. For example, using a hybrid propulsion system for a rocket allows for thrust termination, rocket motor restart, and throttling capabilities. Furthermore, hybrid propulsion systems are inherently immune to explosion. Immunity to explosion is of great importance to rocket-powered vehicle designers that hope one day to operate their sub-orbital and orbital spaceplanes alongside jet-powered vehicles at public use airports. The safety and simplicity of the hybrid propulsion systems leads to lower development costs for new systems and lower operational costs. Additionally, the combustion products are generally very benign, producing a lower environmental impact. Finally, rockets with hybrid propulsion systems typically have a less complex design with a potentially higher reliability, and are also comparably less costly to develop, manufacture, and operate than the other rockets. The solid fuel grain of a hybrid rocket is typically formed by either casting melted sold fuel within a fuel motor case or by separately casting the fuel grain in a mold. In the latter instance, the solid fuel grain is "cartridge-loaded" into a motor case after the molding process. In this manufacturing method, the nozzle is engineered to be separated from the case to allow such loading. In another variation of this method, the solid fuel grain may be separately molded in multiple sections, allowing easier handling.

In a hybrid propulsion system, the burning rate is limited by the heat transfer from the relatively remote flame to the burning surface of the fuel. One of the physical phenomena that limits the burning rate in the hybrid propulsion system is the so-called blocking effect that is caused by the high velocity injection of vaporizing fuel into the gas stream. This difference in the combustion scheme of the hybrid propulsion systems significantly alters the burning rate characteristics compared to a solid propellant. Consequently, the regression rate of a conventional hybrid fuel is typically one-tenth or less than that of a solid propellant.

For a given selection of fuels and oxidizer-to-fuel mass ratios, the thrust generated by a rocket is approximately proportional to the mass flow rate. For a rocket with a hybrid propulsion system using a slow-burning conventional fuel, high thrust can only be achieved by increasing the burning surface area. The high burning area requirements and design constraints (such as the maximum grain length-to-port diameter ratio), lead to complicated multi-port configurations, such as a wagon wheel configuration. The complicated configurations cause further inefficiencies, such as unburned fuel.

The low regression rates and consequent multi-port design requirements often make rockets with a hybrid propulsion system an unattractive option, even though they offer significant advantages over current liquid and solid systems. In order for the hybrid propulsion systems to find use as a practical design with a variety of applications, higher regression rates are required. Therefore, it would be highly desirable to provide a propellant and fuel grain architecture that exhibits a high regression rate, without compromising the safety or the lower manufacturing cost associated with hybrid propulsion systems.

SUMMARY OF THE INVENTION

The present invention is a solid fuel grain for a hybrid propulsion system of a rocket and a method for manufacturing same, and, more particularly, a solid fuel grain manufactured using a freeform-fabrication machine.

An exemplary solid fuel grain suitable for use in hybrid propulsion systems and made in accordance with the present invention has a generally cylindrical shape and defines a center port. The solid fuel grain is formed as a series of concentric layers arrayed around the center port. When incorporated into a rocket, an oxidizer is introduced into the solid fuel grain along a pathway defined by the center port, with combustion occurring along the exposed surface area of the solid fuel grain section adjacent to the center port. Each concentric layer has a surface pattern that serves to increase the surface area for combustion, a surface pattern that persists even as the fuel burns. Unlike prior art constructions that increase the surface area through a multi-port architecture at the sacrifice of fuel loading, the solid fuel grain of the present invention allows a smooth burning process whereby, as each layer is ablated, a new layer is presented to the flame sheet. This process continues until either the solid fuel grain or oxidizer is exhausted.

To achieve such a construction, the concentric layers of the solid fuel grain are preferably manufactured using any one of several available freeform-fabrication machines capable of fabricating articles in a polymeric material suitable for a hybrid propulsion system.

DETAILED DESCRIPTION OF THE INVENTION

The present invention is a solid fuel grain for a hybrid propulsion system of a rocket and a method for manufacturing same, and, more particularly, a solid fuel grain manufactured using a freeform-fabrication machine.

Figure 1:
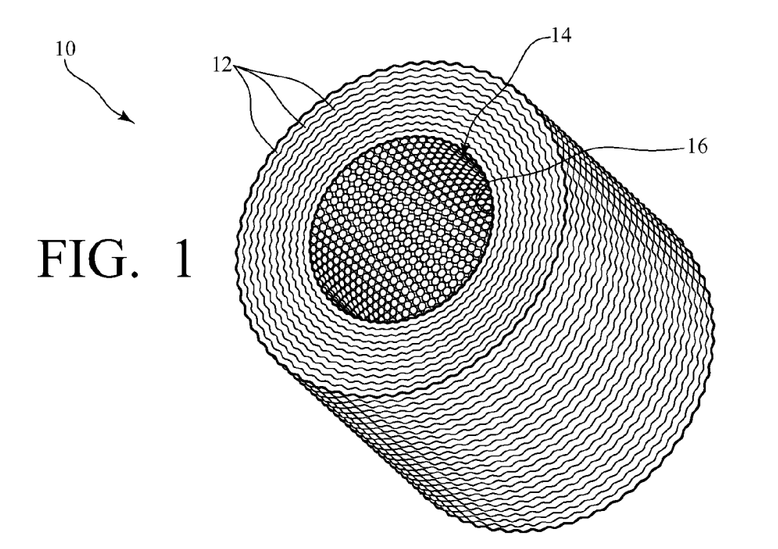
FIG. 1 is a perspective view of a solid fuel grain section made in accordance with the present invention.
Figure 2:
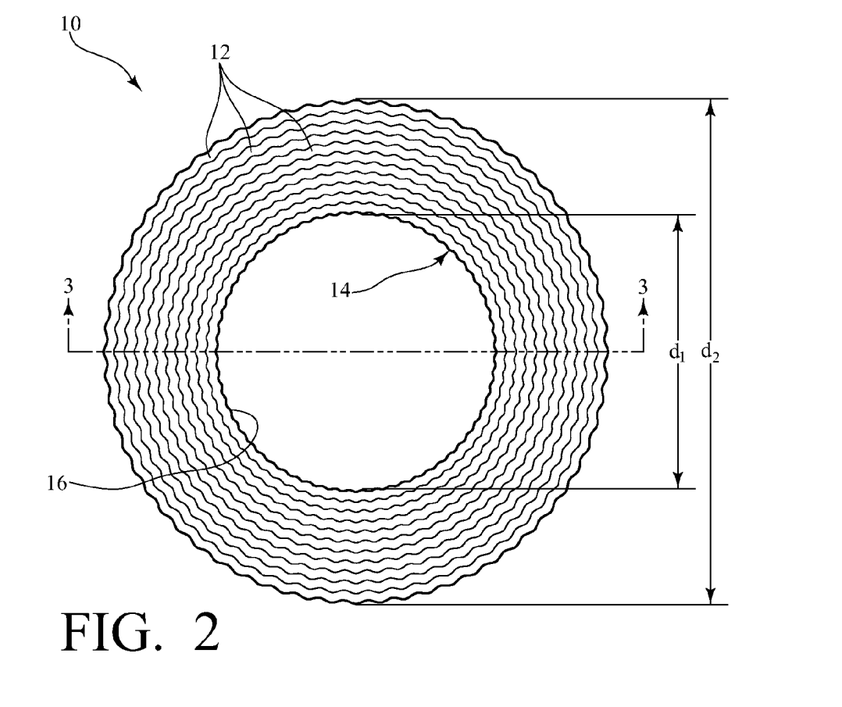
FIG. 2 is a top view of the solid fuel grain section of FIG. 1.
Figure 3:
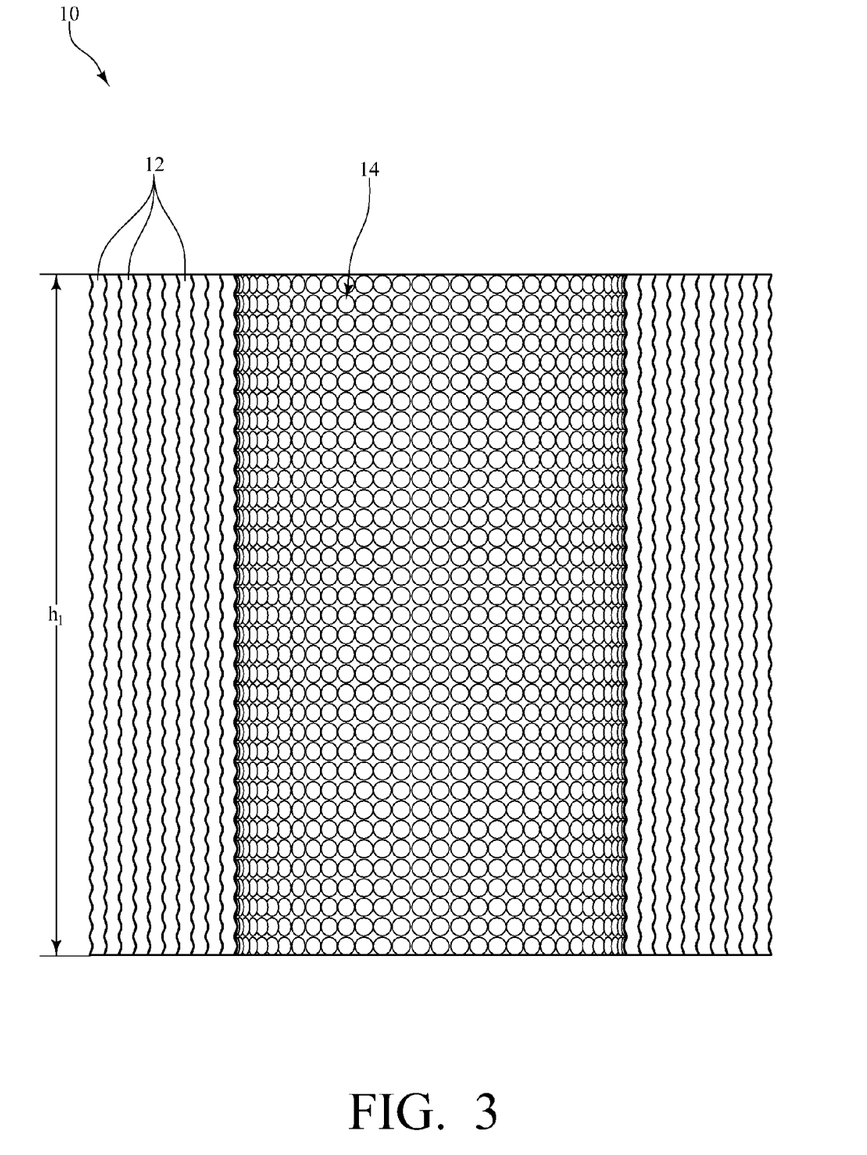
FIG. 3 is a sectional view of the grain section of FIG. 1, taken along line 3-3 of FIG. 2.

FIGS. 1-3 are various views of an exemplary solid fuel grain section 10 suitable for use in hybrid propulsion systems and made in accordance with the present invention. The fuel grain section 10 has a generally cylindrical shape and defines a center port 16. In this exemplary embodiment, the center port 16 has a substantially circular cross-section, but the center port 16 could have other geometries, such as a star, without departing from the spirit or scope of the present invention. More importantly, the solid fuel grain section 10 is formed as a series of concentric layers 12 arrayed around the center port 16. As is further described below, when incorporated into a rocket, an oxidizer is introduced into the solid fuel grain section 10 along a pathway defined by the center port 16, with combustion occurring along the exposed surface area of the solid fuel grain section 10 adjacent to the center port 16. Accordingly, each concentric layer has a surface pattern 14 that serves to increase the surface area for combustion, a surface pattern 14 that persists even as the fuel burns. Unlike prior art constructions that increase the surface area through a multi-port architecture at the sacrifice of fuel loading, the solid fuel grain section of the present invention allows a smooth burning process whereby, as each layer is ablated, a new layer is presented to the flame sheet as combustion continues. This process continues until either the solid fuel grain or oxidizer is exhausted.

Although the fuel grain section 10 may be manufactured in various sizes or dimensions, in this exemplary embodiment, the fuel grain section 10 has an external diameter, d, of 19.0 inches. Although a wide range of diameters are possible, the center port 16 has an initial diameter, $d_1$, of 2.0 inches in this exemplary embodiment (although a larger diameter is shown in the Figures to enable a better view of the interior of the fuel grain section 10.) Each of the concentric layers would have an approximate thickness of 0.005 to 0.015 inches, with such layer thickness at least partially dependent on the particular free form-fabrication machine used in manufacturing the fuel grain section 10, as is further described below.

As for the surface pattern 14, as stated above, the objective is to increase the surface area for combustion. In this exemplary embodiment, and as illustrated in FIGS. 1-3, the surface pattern 14 is characterized by rows of aligned projections integral with and extending from each concentric layer. In FIGS. 1-3, the individual projections are identifiable and have a substantially cylindrical shape. However, in practice, such projections may be not be perceptible to a viewer, but may be microscopic. Accordingly, such projections are analogous to the villi in the small intestines of humans beings, i.e., small projections that protrude from the wall of the small intestines for increasing the intestinal absorptive surface area.

Alternatively, the surface pattern may take other forms in order to achieve the objective of increasing the surface area for combustion. For example, the surface pattern may be characterized by multiple dimples formed in each concentric layer.

To achieve such a construction, the concentric layers 12 of the solid fuel grain section 10 are preferably manufactured using any one of several available freeform-fabrication machines capable of fabricating articles in a polymeric material suitable for a hybrid propulsion system. For instance, the concentric layers 12 of the solid fuel grain section 10 may be formed on a freeform-fabrication machine manufactured and distributed by Stratasys, Inc., of Eden Prairie, Minn. and marketed under the trade name, Maxum™. The Maxum™ freeform-fabrication machine is one of several models of FDM machines manufactured by Stratasys, Inc. It is capable of producing near net-shape articles in wax or acrylonitrile butadiene styrene (ABS) thermoplastic. Because the build envelope of the Maxum™ freeform-fabrication machine is of insufficient volume to fabricate most solid fuel grains in one piece, a complete solid fuel grain may be formed in solid fuel grain sections 10 and later assembled to form the complete solid fuel grain, as is further described below.

Of course, various other commercially available freeform-fabrication machines could also be used without departing from the spirit and scope of the present invention, including, but not limited to, freeform-fabrication machines manufactured and distributed by: 3D Systems, Inc. of Rock Hill, S.C.; EnvisionTEC GmbH of Gladbeck, Germany; and Objet Geometries, Ltd. of Rehovot, Israel. Similarly, various polymeric materials could be used without departing from the spirit and scope of the present invention, including, but not limited to: polycarbonate; ABS/polycarbonate blends, polyphenylsulfone, and/or proprietary materials or blends recommended by manufacturers of freeform-fabrication machines.

Figure 4:
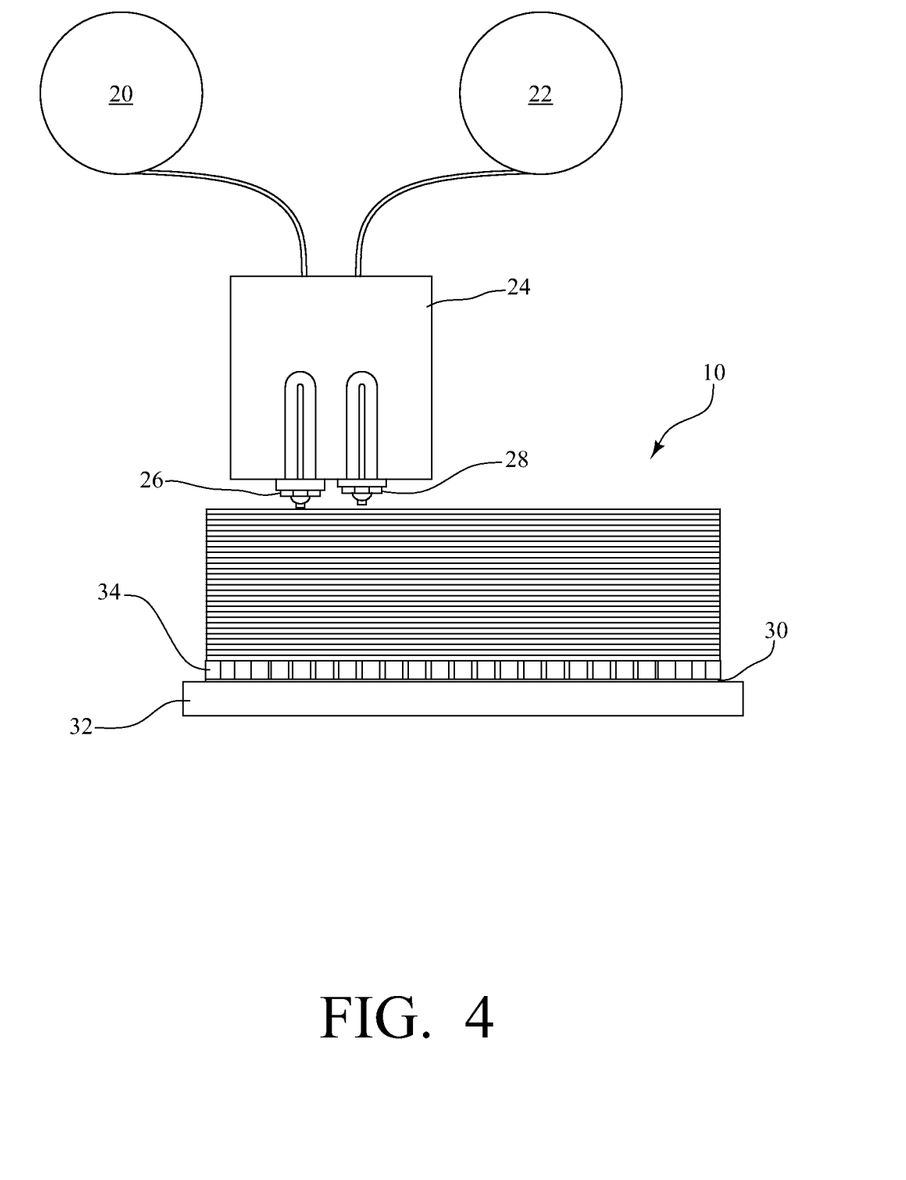
FIG. 4 is a view of an exemplary method for manufacturing the solid fuel grain section of FIG. 1.

Referring now to FIG. 4, in an exemplary method for manufacturing the solid fuel grain section 10, the freeform-fabrication process begins with two cartridge mechanisms. One cartridge 20 stores a spool of ABS thermoplastic that is used for the solid fuel grain section 10. The second cartridge 22 stores a spool of water-soluble disposable material that is used to separate the solid fuel grain section 10 from a support base and support any overhanging structures specified in the design. An example of an appropriate water-soluble disposable support material is WaterWorks™, which is also manufactured and distributed by Stratasys, Inc., of Eden Prairie, Minn.

Once the freeform-fabrication process has commenced, monofilament lines are spooled out from each cartridge 20, 22 and are fed into liquefiers (not shown) housed in a module 24, with such liquefiers heating the mono filament lines to their respective melting temperatures. The resulting liquefied ABS thermoplastic and support material is then forced through respective injection nozzles 26, 28 housed in the same module 24, so as to form small diameter beads of material that are laid down upon the support base, in this example, a substantially flat plastic sheet 30. In this regard, the module 24 housing the liquefiers and respective injection nozzles 26, 28 is robotically-controlled to allow for movement along two axes (X, Y) in a plane substantially parallel to the underlying plastic sheet 30. The plastic sheet 30 is mounted to a robotically-controlled elevator platform 32 that moves along an axis (Z) substantially perpendicular to the module 24 housing the liquefiers and respective injection nozzles 26, 28. Thus, the elevator platform 32 can drop a distance equal to the specified layer thickness after each successive layer has been formed. Thus, the ABS thermoplastic material is extruded and placed to form each successive layer according to the chosen design of the solid fuel grain section 10, with each successive layer being extruded and laid down upon the preceding layer. As each layer cools and solidifies, a fusion bond develops between layers. Once the solid fuel grain section 10 is formed in this manner, the solid fuel grain section 10 is removed from the freeform-fabrication machine and placed into a water solution to dissolve and remove any build support material 34. The freeform-fabricated solid fuel grain section 10 has a substantially uniform fuel grain density and is substantially free of voids. Furthermore, the grain section 10 will normally require only minimal surface treatment in preparation for assembly.

Figure 5A:
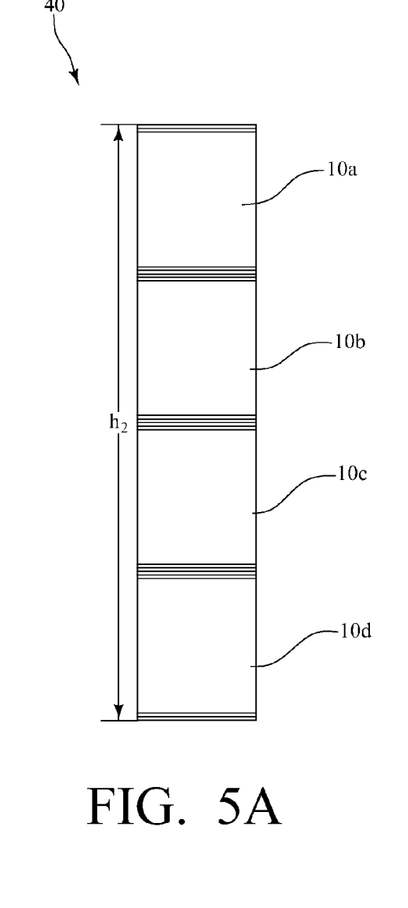
FIG. 5A is a side view of a solid fuel grain comprised of a plurality of solid fuel grain sections.
Figure 5B:
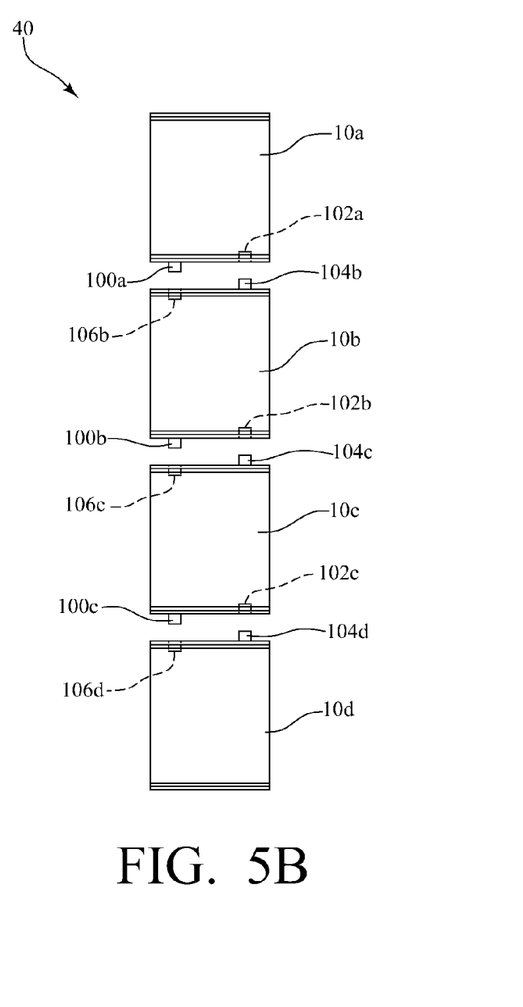
FIG. 5B is a side view of a solid fuel grain comprised of a plurality of solid fuel grain sections similar to that of FIG. 5A, but with the solid fuel grain sections separated from one another.

Referring now to FIGS. 5A-5B, the individual fuel grain sections 10 can then be assembled and joined together to form a complete solid fuel grain 40. In this exemplary embodiment, each solid fuel grain section 10 has a height, $h_1$, of 23 inches, such that the overall height, $h_2$, of the complete solid fuel grain 40 is 92 inches. Furthermore, in this exemplary embodiment, the topmost solid fuel grain section 10a has at least one connecting member 100a extending from its lower surface and at least one cavity 102a defined in its lower surface for receiving a mating connecting member. Similarly, the intermediate solid fuel grain sections 10b, 10c each have at least one connecting member 100b, 100c extending from their respective lower surfaces and one connecting member 104b, 104c extending from their respective upper surfaces, and further each have at least one cavity 102b, 102c defined in their respective lower surfaces and at least one cavity 106b, 106c defined in their respective upper surfaces. Finally, the lowermost solid fuel grain section 10d has at least one connecting member 104d extending from its upper surface and at least one cavity 106d defined in its upper surface for receiving a mating connecting member. Accordingly, the solid fuel grain sections 10a, 10b, 10c, 10d can be readily stacked, aligned, and mated to one another to form the complete solid fuel grain 40.

Figure 6:
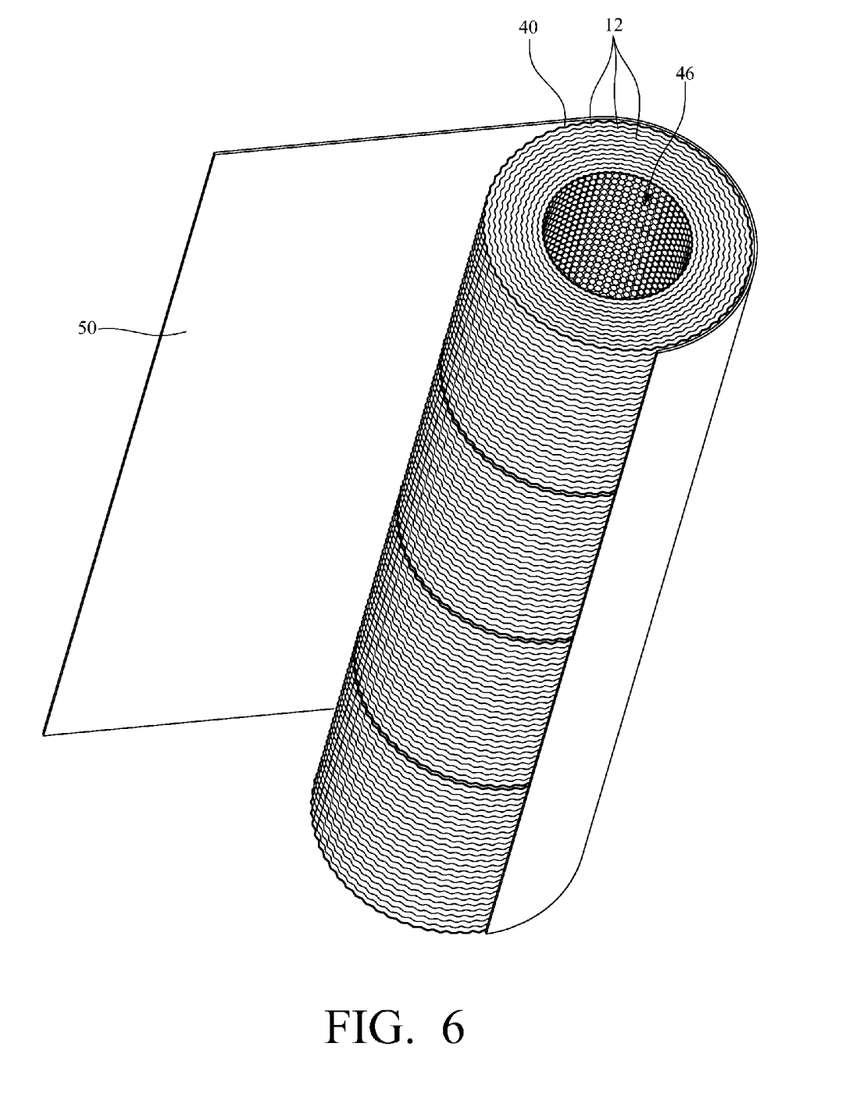
FIG. 6 is a perspective view of the plurality of solid fuel grain sections of FIG. 5A being wrapped with insulating film.

Referring now to FIG. 6, after the solid fuel grain sections 10a, 10b, 10c, 10d are assembled, the solid fuel grain sections 10a, 10b, 10c, 10d collectively define a center port 46 through the solid fuel grain 40. The solid fuel grain 40 is preferably wrapped in a film 50 made of phenol or other suitable material. Placed between the inner wall of a fuel motor case (not shown in FIG. 5) and the outer surface of the solid fuel grain 40, the film 50 acts as an insulation layer to reflect heat and prevent damage to fuel motor cases made from non-metallic materials. Once wrapped in the film 50, the solid fuel grain 40 can be placed into a motor case of a rocket.

Figure 7:
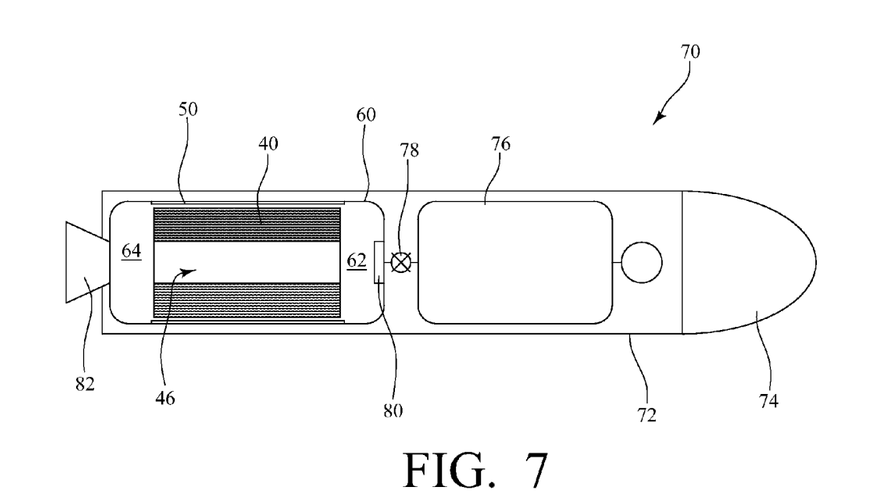
FIG. 7 is a sectional view of an exemplary rocket incorporating the solid fuel grain of FIGS. 5A, 5B, and 6.

FIG. 7 is a sectional view of an exemplary rocket 70 incorporating the solid fuel grain 40 as described above with respect to FIGS. 5A, 5B, and 6. The exemplary rocket 70 generally comprises a body 72, a nozzle 82 at one distal end of said body 72, and a payload section 74 at an opposite distal end of said body 72. Enclosed within the body 72 of the rocket 70 are an oxidizer tank 76, a valve 78, a fuel motor case 60, and an injector 80. The motor case 60 houses a pre-combustion chamber 62, a post-combustion chamber 64, and the solid fuel grain 40, which as described above, is wrapped in insulating film 50. The solid fuel grain 40 wrapped in insulating film 50 can be "cartridge loaded" into the motor case 60 of the rocket 70. Alternatively, the exemplary solid fuel grain 40 wrapped in insulating film 50 could be wound with a fiber-reinforced polymer composite to form the motor case 60 without departing from the spirit and scope of the present invention.

Figure 8:
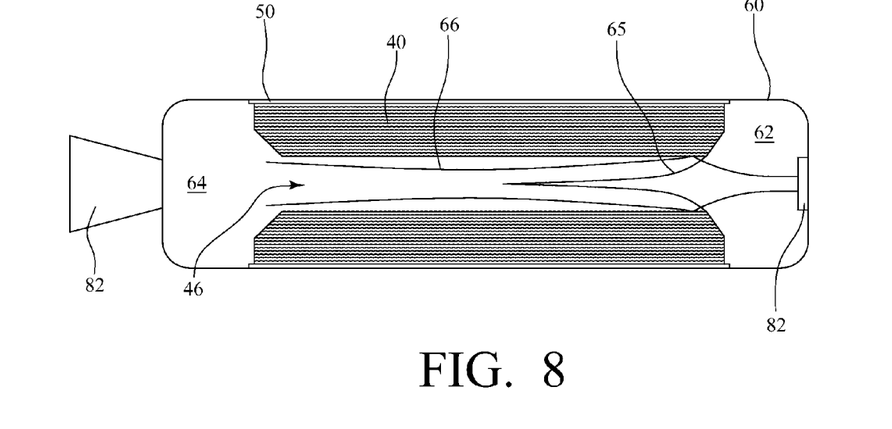
FIG. 8 is an enlarged sectional view of the motor case of the rocket of FIG. 7, showing a flame configuration.

FIG. 8 is an enlarged sectional view of the motor case 60 of the rocket 70 of FIG. 7, showing a flame configuration. As shown, an oxidizer (either a liquid or a gas) is injected into the motor case 60 along a pathway defined by the center port 46 of the solid fuel grain 40 and flows over the solid fuel grain 40, forming a boundary layer 65 over the solid fuel grain 40. The boundary layer 65 is usually turbulent over a large portion of the length of the port 46. Within the boundary layer 65 is a turbulent diffusion flame sheet 66 that extends over the entire length of the solid fuel grain 40 above the surface of the solid fuel grain 40, melting the exposed surface of the solid fuel grain 40, and causing a liquid fuel layer to form. Evaporation from the liquid-gas interface produces a continuous flow of fuel gas that mixes with oxidizer at the flame sheet 66 to maintain combustion along the exposed surface area of the solid fuel grain 40 adjacent to the center port 16. At steady state, the regression rate of the melt surface and the liquid-gas interface are the same and the thickness of the liquid layer is constant. Because the surface pattern 14 increases the surface area, the exemplary solid fuel grain 40 has the increased regression rate and corresponding thrust impulse without the decreased fuel volumes associated with multi-port designs.

Figures 9A, 9B, 9C:
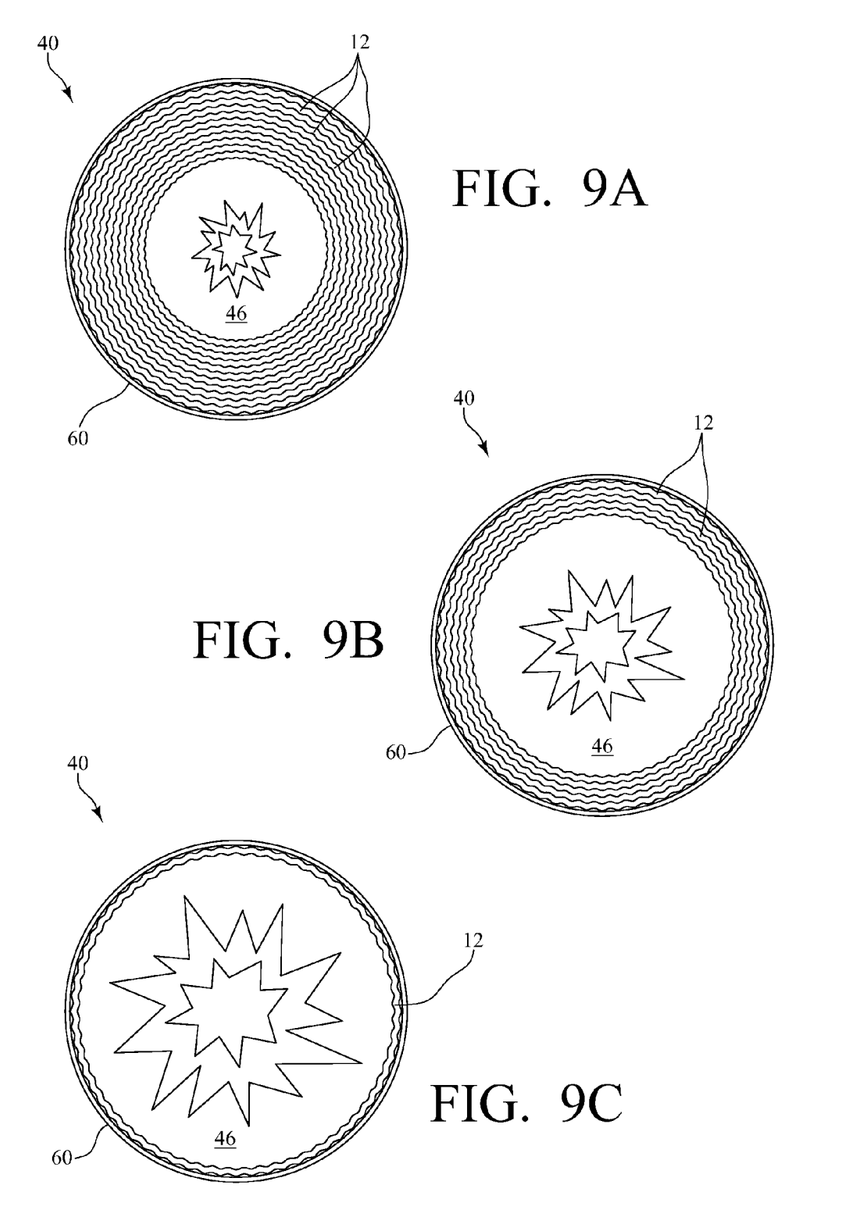
FIGS. 9A, 9B, and 9C are top views of the fuel grain section of FIG. 1 as consumed by a flame.

Also, unlike the prior art constructions that increase the surface area through a multi-port architecture at the sacrifice of fuel loading, the solid fuel grain 40 of the present invention allows a smooth burning process whereby, as each layer is ablated, a new layer is presented to the flame sheet, as shown in FIGS. 9A-9C. This burning process continues until either the solid fuel grain 40 or oxidizer is exhausted.

One of ordinary skill in the art will recognize that additional embodiments are also possible without departing from the teachings of the present invention or the scope of the claims which follow. This detailed description, and particularly the specific details of the exemplary embodiment disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A method of making a fuel grain for a rocket motor comprising:

(a) first forming a first layer of oxidizer free grain material substantially free of accessible voids using a freeform-fabrication apparatus; and (b) second forming a succession of additional layers of oxidizer free grain material substantially free of accessible voids using the freeform-fabrication apparatus, each successive layer bound to an adjacent layer;

wherein (c) the oxidizer free grain material includes at least one chemical component suitable for a rocket propulsion combustion reaction, and (d) the layers form a fuel grain having at least one combustion port;

wherein the first and second forming form the first layer and the additional layers each as a substantially ring shape of substantially equal diameter, laterally stacked on each other, and bonded together;

wherein the substantially ring shape of each of the first layer and the additional layers comprises radially concentric abutting substantially ring shapes, the radially concentric abutting substantially ring shapes having an outer circumference with a predetermined pattern of peaks and valleys and an inner circumference with a predetermined pattern of peaks and valleys;

wherein the predetermined patterns on the inner and outer circumferences present larger surface areas and provide increased regression rate of the fuel grain relative to a perfect ring shape.

2. The method of claim 1 wherein the fabrication apparatus allows positive placement of grain material in three dimensions.

3. The method of claim 1 wherein the fabrication apparatus is a Fused Deposition Modeling machine.

4. The method of claim 1 wherein the forming a succession of additional layers comprises forming a successive layer by applying a liquid phase grain material supported by a previously solidified layer of grain material.

5. The method of claim 4 wherein a step of forming a successive layer of grain material binds a successive layer directly to a previously-formed layer.

6. The method of claim 1 wherein the first layer and additional layers are substantially entirely composed of a fuel component suitable for a hybrid rocket propulsion combustion reaction.

7. The method of claim 1 further including a step of encasing the fuel grain within an insulating material.

8. The method of claim 1 wherein the first layer and additional layers are substantially uniform in material composition.

9. The method of claim 1 wherein the combustion port is a central combustion port and has a substantially circular-cross section.

10. The method of claim 1 wherein the combustion port is a central combustion port having a non-circular cross-section.

11. The method of claim 1 wherein the first layer and the additional layers form a fuel grain having multiple ports.

12. The method of claim 1 further including a step of assembling multiple grains into a multi-section grain.

13. A method of constructing a rocket motor comprising steps of:
(a) first forming a first layer of oxidizer free grain material substantially free of accessible voids using a freeform-fabrication apparatus;
(b) second forming a succession of additional layers of oxidizer free grain material substantially free of accessible voids using the freeform-fabrication apparatus, each successive layer bonded to an adjacent layer; and
(c) connecting the fuel grain to a rocket nozzle;
wherein
(d) the oxidizer free grain material includes at least one chemical component suitable for a rocket propulsion combustion reaction, and
(e) the layers form a fuel grain having at least one combustion port;
wherein the first and second forming form the first layer and the additional layers each as a substantially ring shape of substantially equal size, laterally stacked on each other, and bonded together;
wherein the substantially ring shape of each of the first layer and the additional layers comprises radially concentric abutting substantially ring shapes, the radially concentric abutting substantially ring shapes having an outer circumference with a predetermined pattern of peaks and valleys and an inner circumference with a predetermined pattern of peaks and valleys;
wherein the predetermined patterns on the inner and outer circumferences present larger surface areas and increased regression rate of the fuel grain relative to a perfect ring shape.

14. The method of claim 1, wherein the first layer and additional layers are substantially uniform in material composition.

15. The method of claim 1, wherein the predetermined pattern is microscopic and not visible to the naked eye.

16. The method of claim 13, wherein the predetermined pattern is microscopic and not visible to the naked eye.

* * * * *